United States Patent Office

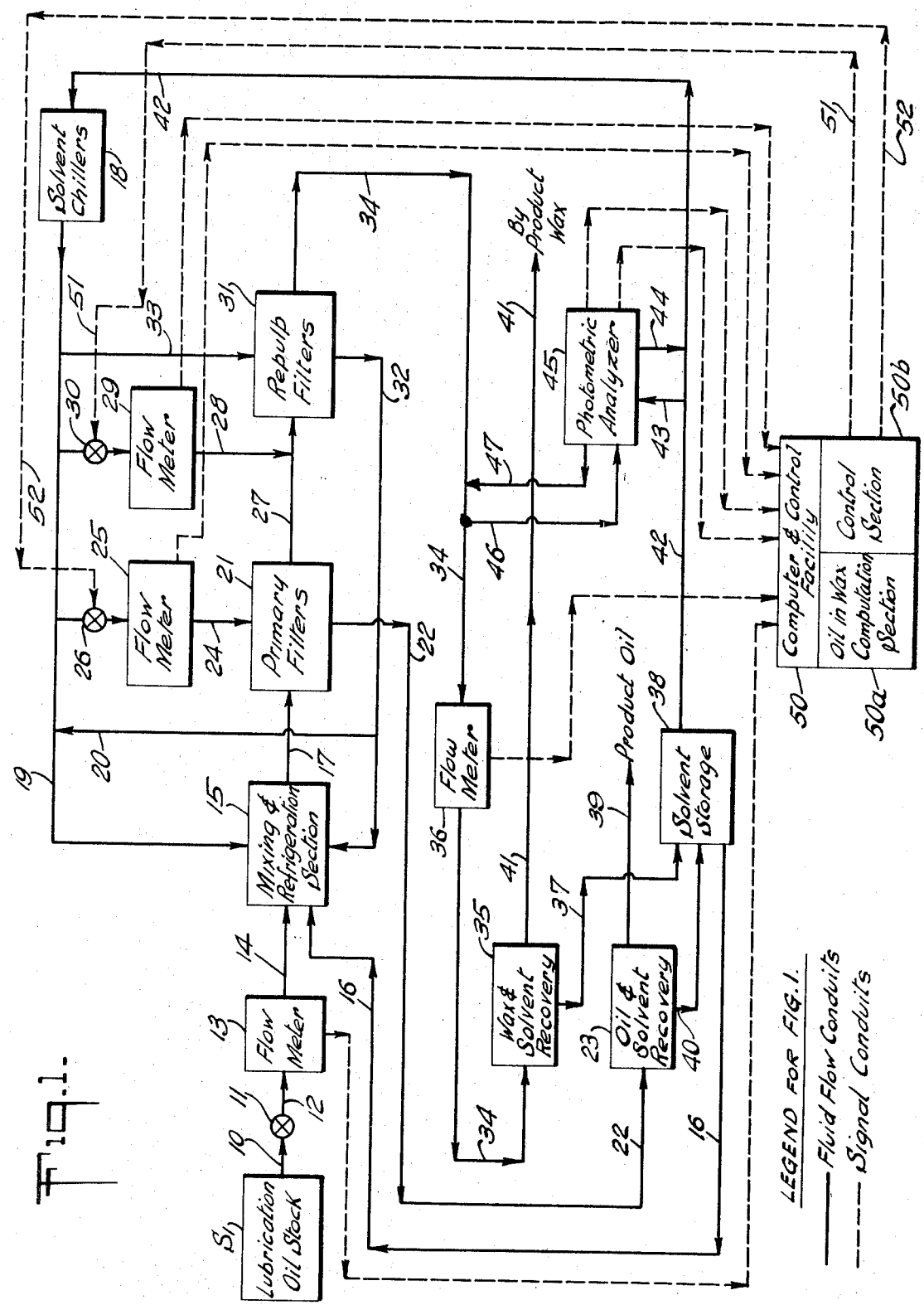

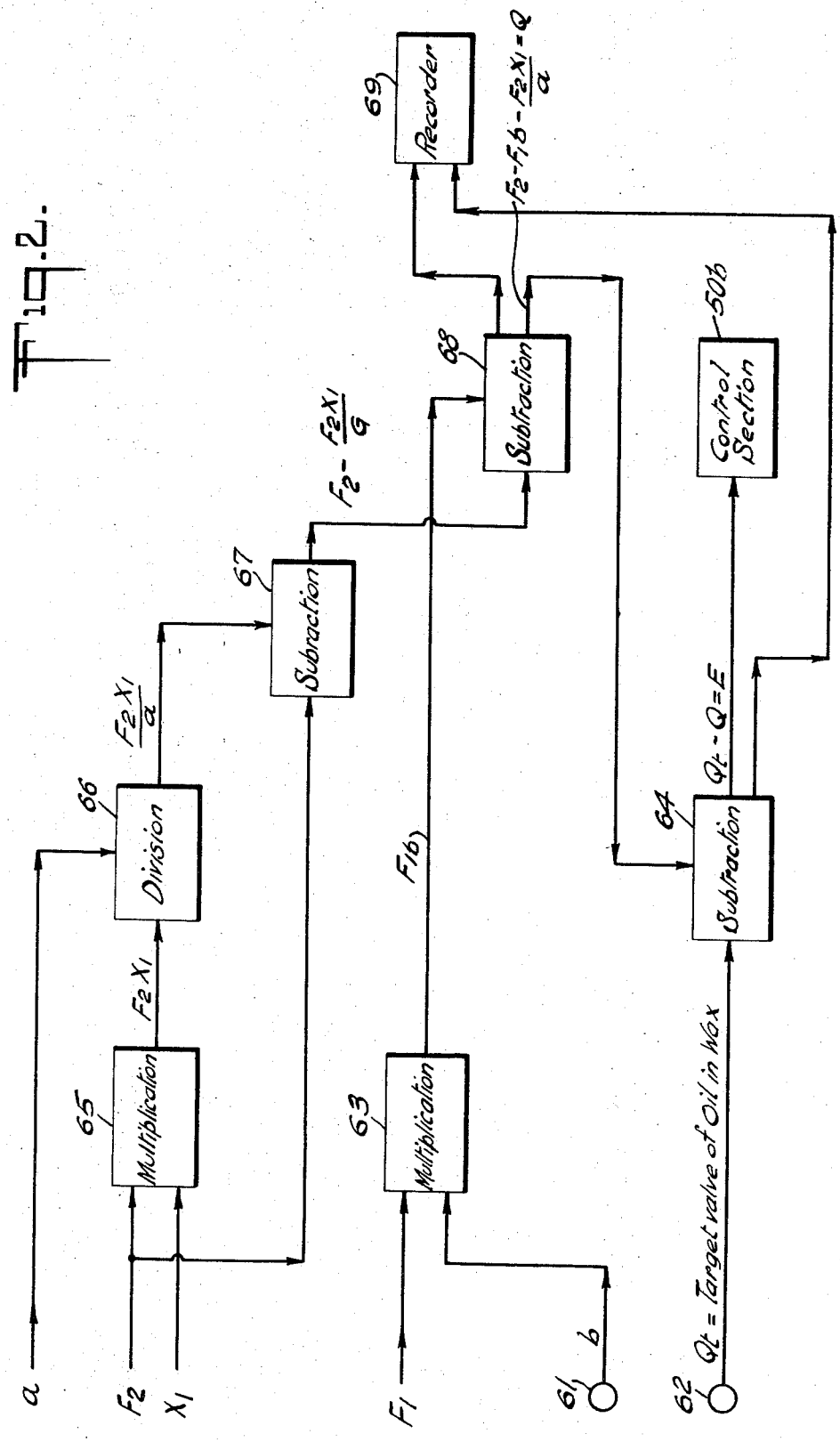

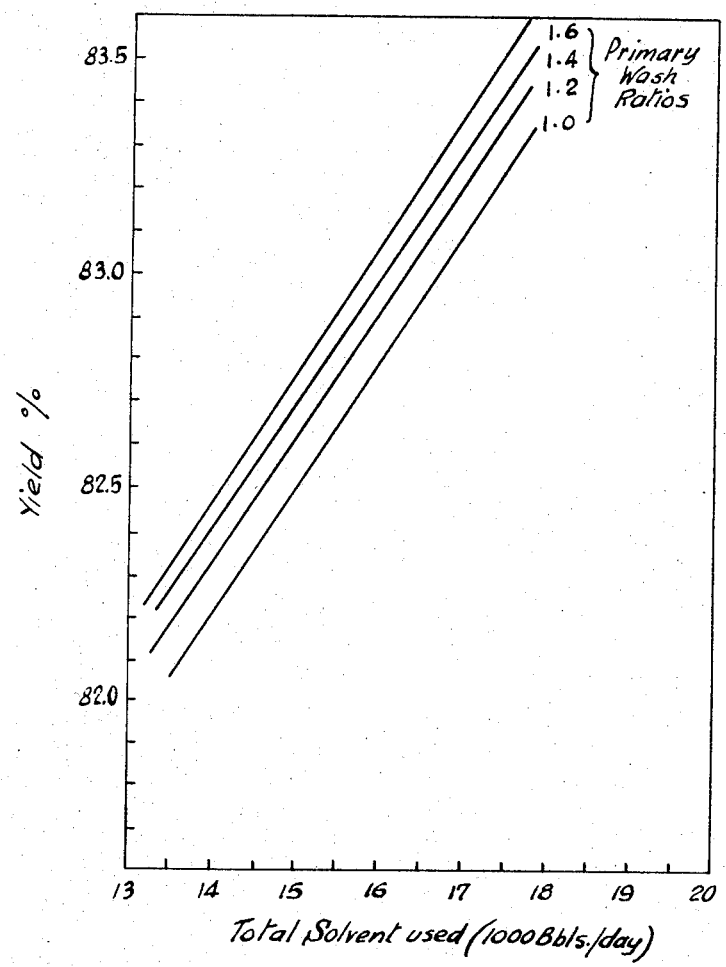

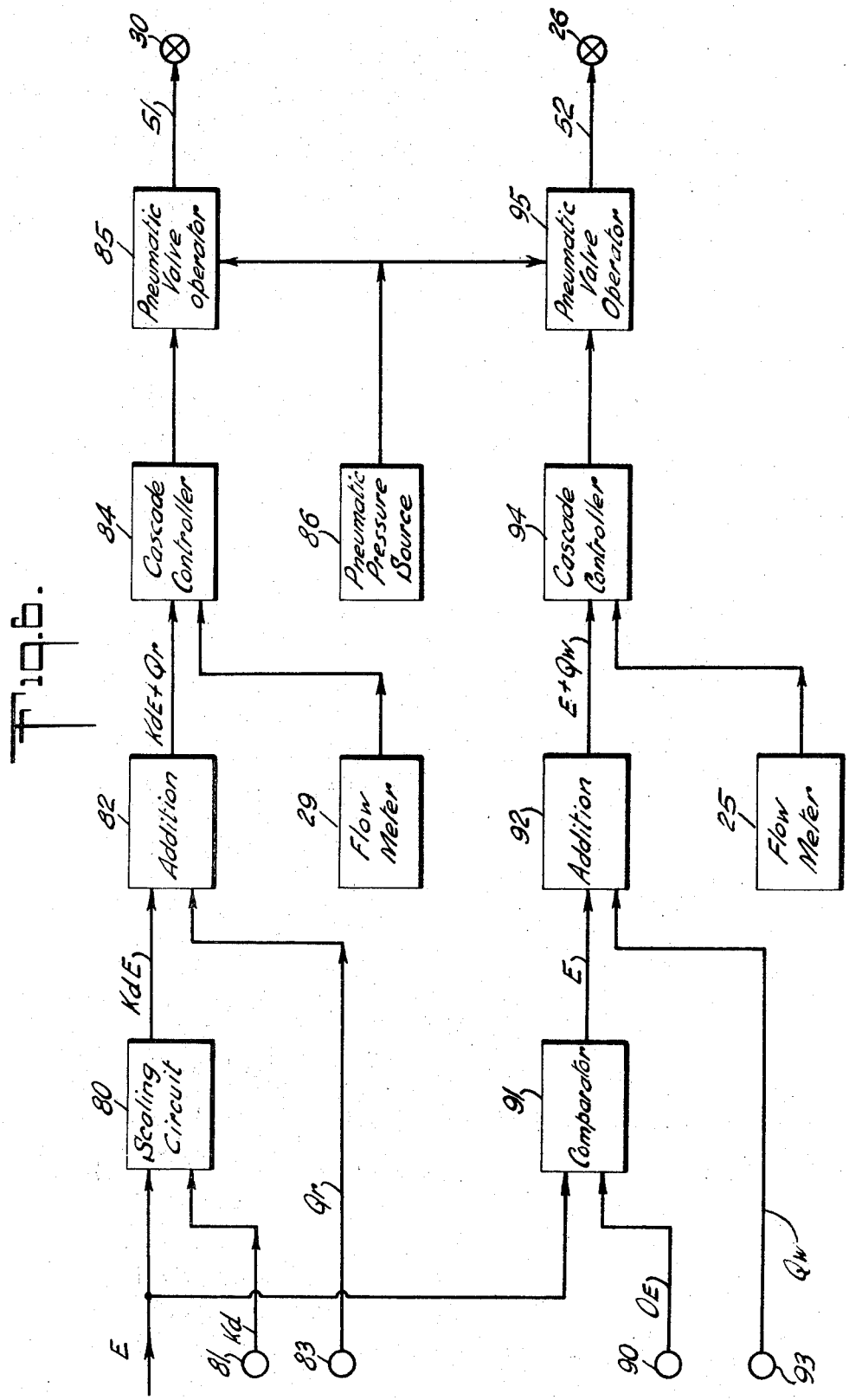

3,549,514
Patented Dec. 22, 1970

3,549,514
METHODS AND APPARATUS FOR MONITORING AND CONTROL OF SOLVENT DEWAXING PROCESSES
William F. Brown, William E. Crockett, and Charles H. Brodeur, Wappingers Falls, N.Y., assignors to Texaco Inc., New York, N.Y., a corporation of Delaware
Filed Jan. 9, 1969, Ser. No. 790,113
Int. Cl. C10g *43/08*
U.S. Cl. 208—33                                      16 Claims

ABSTRACT OF THE DISCLOSURE

Disclosed are methods and apparatus for monitoring and control of a solvent dewaxing process of a lubrication oil stock. Signals are generated corresponding to the process charge rate, the wax removal rate, the amount of wax entrained solvent, and the amount of wax for removal. The signals are combined to determine and provide a signal of the amount of oil entrained in the removed wax in accordance with a mass balance relationship, thereby monitoring the process by obtaining information of its yield. To control the process in response to the latter signal suitable process variables are controlled such as the repulp liquids-to-solids ratio, the wax wash rate, and the process charge rate. Also disclosed are methods for selecting the best operating points for maximum economy of the process, and a novel method for controlling the process by controlling the repulp liquids-to-solids ratio. The apparatus includes flow rate sensing means for generating signals of the process charge rate, and the wax removal rate, a solvent detector, such as a photometric analyzer for generating a signal of the amount of wax entrained solvent, and a computer receiving the aforementioned signals for computing and providing a signal of the amount of oil entrained in the removed wax. Process control means are provided responsive to the latter signal and coupled to suitable modulating valves for controlling the process tending to control the yield by controlling the repulp liquids-to-solids ratio, the wax solvent wash rate, or the process charge rate.

BACKGROUND OF THE INVENTION

This invention relates to methods and apparatus for monitoring and control of hydrocarbon refining processes and, more particularly, to monitoring and control of solvent dewaxing processes.

The dewaxing processes as presently known are used primarily in the petroleum refining industry to remove wax from a lubrication oil stock which is usually a fraction of partially refined crude oil. These processes almost invariably leave a residual amount of oil entrained in the removed wax. Since the oil is a more valuable product than the wax such entrained oil constitutes a waste aspect of the process. Also such entrained oil adversely affects the quality of the wax. Nevertheless, controlling the process to reduce the amount of waste oil is an economic compromise due to limitations of the process equipment which tends to increase operating costs or decrease the overall through-put when the process is controlled to minimize the amount of waste oil. Therefore, in any solvent dewaxing control system it is of great importance to have a continuous on-stream measurement of the amount of oil entrained in the removed wax.

There are many controllable variables which can be used to control the presently known versions of the methyl-ethyl ketone dewaxing process. These versions of the process include those which, in addition to using the conventional filtration step, include a repulping and refiltration step and solvent washing of the primary and repulp wax cakes. Thus, for example, the solvent washing rate of the primary filter, of the repulp filter, the repulp dilution, and the overall process charge rate may all be used, singularly or in combination, as controllable variables affecting the amount of oil in the removed wax. However, when these and other variables are adjusted to control the process such adjustments tend to have an impact on the economics of other aspects of the process. Thus, for example, increases in the solvent wash rate increase the load on the solvent recovery and refrigeration facilities. Also, decreases in the process charge rate have the result of decreases of the net through-put rate, i.e., the productivity of the process. It can be seen that for purposes of control of the process to obtain maximum quality of the products at minimum costs the exact numeric relationships between the controllable variables depend upon the particular equipment of each dewaxing facility. It can also be seen that a continuous on-stream measurement of the oil entrained in the removed wax as an indication of yield, is of major importance as a criterion for automatic control of the process. Also, of great importance as a controllable variable of the process is the liquids-to-solids ratio of the repulp mixture. The invention as herein disclosed provides the capability by unique and novel methods employing the use of measurement and computing apparatus in unique and novel combination for providing continuous on-stream information of the oil entrained in the removed wax and for automatic control of the process including control of the liquids-to-solids ratio of the repulp mixture which can be used for optimized control of dewaxing processes.

SUMMARY

Briefly stated, one aspect of the invention resides in a method for monitoring a solvent dewaxing process for removing a predetermined portion of wax from a lubrication oil stock including a method for determining the amount of oil entrained in the removed wax. This aspect includes the steps of sensing the rate at which the oil stock is charged into the process and providing a first signal representative thereof, sensing the rate of removal of the wax mixture and providing a second signal representative thereof, providing a third signal representative of the predetermined wax portion for removal of the oil stock, detecting the solvent entrained in the removed wax and providing a fourth signal representative thereof. The method includes the further step of combining the first, second, third, and fourth signals to provide a fifth signal in accordance with a mass balance relationship relating the amount of oil entrained in the removed wax with the oil stock charge rate into the process, the wax portion for removal of the oil stock, the rate of removal of the wax mixture, and the solvent entrained therein. The fifth signal is thereby representative of the amount of oil entrained in the removed wax mixture, and can be recorded as an indication of the performance of the process.

Another aspect resides in a method for automatically controlling the process in response to the amount of oil entrained in the removed wax mixture. In accordance with this aspect, in response to the fifth signal, the further step is added of controlling one or more suitable controllable variables of the process which have an affect on the amount of oil entrained in the removed wax, such as, for example, controlling the repulp liquids-to-solids ratio, the wax solvent wash rate, or the process charge rate.

Yet another aspect of the invention resides in controlling the yield of the process by controlling the repulp liquids-to-solids ratio in response to a signal representative of the yield of the process.

Still another aspect of the invention resides in a novel method for obtaining an economic quiescent operating point of the process by balancing yield and through-put variations with variations of a suitable controllable variable such as the repulp liquids-to-solids ratio.

Another aspect of the invention resides in apparatus in novel combination for developing the aforementioned fifth signal representative of the oil entrained in the removed wax including first and second rate sensing means for respectively providing the aforementioned first and second charge rate and wax rate signals, detection means, such as, for example, a photometric analyzer for providing the aforementioned fourth signal of the wax entrained solvent, and a computer. The computer includes manual entry means for providing the aforementioned third signal of the removable wax portion in response to a manual input thereof, and means for computing the amount of oil entrained in the removed wax in response to the first, second, third, and fourth signals in accordance with the aforementioned mass balance relationship and for providing a fifth signal corresponding thereto.

In a further embodiment for controlling the process the computer includes a control section including suitable process controllers for controlling the process in response to the fifth signal. The process controllers are coupled to suitable process control means such as one or more automatic control valves for controlling such process variables as the repulp liquids-to-solids ratio, and the wax solvent wash rate.

In another aspect apparatus is provided for controlling the yield of the process by controlling suitable variables of the process, such as, the repulp liquids-to-solids ratio.

In view of the foregoing it is an object of the invention to provide methods for monitoring solvent refining processes.

Another object of the invention is to provide methods for monitoring and automatically controlling a solvent dewaxing process in accordance with the amount of oil entrained in the removed wax.

Another object of the invention is to provide a method for operating a solvent dewaxing process at an economic point of operation.

Another object of the invention is to provide a method for operating a solvent dewaxing process at an economic point of operation by controlling the repulp liquids-to-solids ratio.

Another object of the invention is to provide for a method of determining an operating point of the repulp liquids-to-solids ratio of the process.

Another object of the invention is to provide for a method of controlling a solvent dewaxing process by controlling its yield.

Another object of the invention is to provide embodiments of apparatus to fulfill the aforementioned objectives.

These and other objects, advantages and features of the invention will be more fully understood by referring to the following descriptions and claims taken in conjunction with the accompanying drawings.

BRIEF DESCRIPTION OF THE DRAWINGS

FIG. 1 is a schematic block diagram of a solvent dewaxing system illustrating features of the invention employed to monitor the oil in the removed wax and to control the process.

FIG. 2 is a schematic block diagram of the oil in wax computation section of the computer and control facility shown in FIG. 1.

FIG. 3 is a graph of yield plotted against repulp liquids-to-solids ratio for a typical dewaxing process.

FIG. 6 is a schematic block diagram of the control section of the computer and control facility shown in FIG. 1.

DESCRIPTION OF THE PREFERRED EMBODIMENTS

Figure 4:
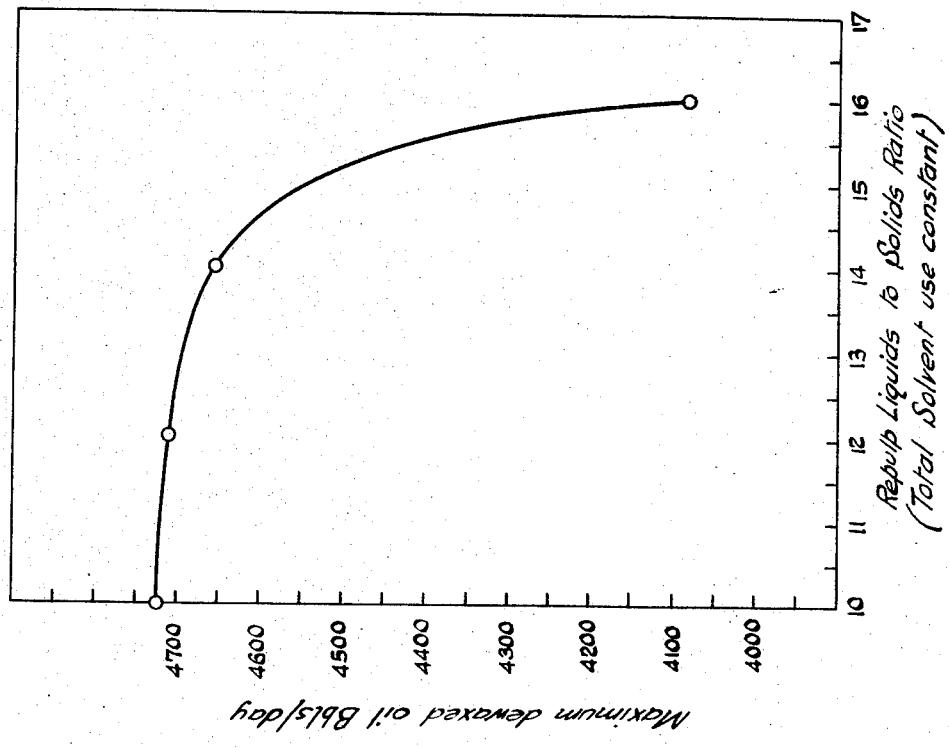
FIG. 4 is a graph of the typical process productivity in barrels of dewaxed oil per day plotted against repulp liquids-to-solids ratio.

Referring now to FIG. 1. A lubrication oil stock for dewaxing is introduced into the system from a source S–1 through a conduit 10, passes through a continuous flow control valve 11 series connected in the conduit 10, passes out of the valve 11 through a conduit 12 from where the oil stock passes through a flowmeter 13, series connected in the conduit 12. The oil stock passes out of the flowmeter 13 through a conduit 14 and enters a mixing and refrigeratiton section 15. The flowmeter 13 is a conventional orifice and differential pressure sensor with a suitable electrical output circuit for providing an electrical analog signal proportional to the flow rate of the oil stock. A suitable mixture of a dewaxing solvent is introduced through a conduit 16 into the mixing and refrigeration section 15 for mixing therein with the oil stock. Also introduced into the mixing and refrigeration section 15 is chilled solvent through a conduit 19 connected with a solvent chilling section 18. Further introduced is a flow of repulp filtrate which is carried by a conduit 20 into the conduit 19 mixing therein with the chilled solvent and thence flowing into the mixing and refrigeration section 15. In accordance with the present art the mixing and refrigeration section 15 includes heating means for heating the oil stock and solvent to a temperature which provides complete solution of the mixture, and further includes a refrigeration section for chilling the mixture to a few degrees below the desired pour point required of the lubrication oil for crystallizing the wax content of the mixture. This results in a mixture of oil and solvent containing crystallized wax. This mixture passes from the mixing and refrigeration section 15 through a conduit 17 to a section of primary filters 21 which include a group of Weir type rotary drum filters arranged in parallel. In the filters the wax content of the inlet mixture is deposited in the form of a wax cake on the drum filters. The dewaxed oil and solvent mixture which is drawn through the filters is removed from the primary filter section 21 through a conduit 22 and passes to an oil and solvent recovery facility 23. The wax collected on the drums of the primary filters is washed with chilled solvent to remove oil entrained in the wax. The chilled solvent is introduced into the primary filter section 21 through a conduit 24 in which are series connected a conventional flowmeter 25, as described above in reference to the flowmeter 13, and a pneumatically operated continuous flow control valve 26 for controlling the flow rate of the washing solvent. The valve 26 is in turn connected with a conduit 19 carrying the chilled solvent.

For further removing oil entrained in the wax, the solvent washed wax is withdrawn from the primary filter section 21 through a conduit 27 where it is remixed with a solvent to form a slurry mixture, known as the repulp mixture. The solvent is introduced into the conduit 27 through a conduit 28 in which are series connected a flowmeter 29, as described above in reference to the flowmeter 13, and a pneumatically operated continuous flow control valve 30 for controlling the flow rate of the repulp dilution solvent. The valve 30 is in turn connected with the conduit 19 carrying the solvent. The repulp mixture in the conduit 27 passes to a group of repulp filters 31 which are similar in construction and operation to the primary filters 21. The filtrate passing through the repulp filters 31 is a mixture of oil and solvent which is withdrawn from the repulp filters through a conduit 32. The conduit 32 is, in turn, connected with the mixing and refrigeration section 15 where the repulp filtrate is mixed with the lubrication oil stock and solvent to be carried to the primary filters. The wax cake deposited on the drums of the repulp filters 31 is washed with chilled solvent introduced into the repulp filters through a conduit 33 which is in turn connected with the conduit 19 carrying the chilled solvent. The solvent washed wax collected on the drums of the repulp filters contain a small amount of entrained oil and a substantial fraction of solvent. This wax mixture is removed from the repulp filters 31 through a conduit 34 which carries the mixture to a wax and solvent recovery facility 35. Series connected in the conduit 34 is a flowmeter 36, as described above in reference to the flowmeter 13, for measuring the flow rate of the repulp wax mixture. The wax and solvent recovery facility 35 includes conventional fractionators and steam strippers for separating the solvent from the wax. The solvent recovered in the wax and solvent recovery facility 35 is withdrawn therefrom through a conduit 37 which is in turn connected with a temporary solvent storage tank 38 where the recovered solvent is temporarily stored for subsequent reuse in the process.

The oil and solvent recovery facility 23 includes equipment similar to that of the wax and solvent recovery facility 35 and separates the oil from the solvent of the filtrate from the primary filter section 21. Dewaxed product oil is withdrawn from the oil and solvent recovery facility 23 through a conduit 39, through which, the product oil leaves the process and is carried to suitable product oil storage facilities not shown. The recovered solvent is withdrawn from the oil and solvent recovery facility 23 through a conduit 40 which is, in turn, connected with the temporary solvent storage tank 38. The by-product wax from the process is withdrawn from the wax and solvent recovery facility 35 through a conduit 41 in which it is carried to suitable wax storage facilities not shown.

The recovered solvent in the temporary solvent storage tank 38 is withdrawn therefrom by two main streams. A first stream is withdrawn through the conduit 16 which is connected with the mixing and refrigeration section 15 where the solvent is mixed with the oil stock as discussed above. A second stream is withdrawn from the temporary solvent storage tank 38 through a conduit 42 which is in turn connected with the solvent chillers 18 where the solvent is chilled to a temperature about equal to the dewaxing temperature. The solvent thus chilled is withdrawn from the solvent chillers 18 through the conduit 19 where the solvent is made available for use in the primary dilution, the repulp dilution, and the primary and repulp solvent washing discussed above.

A side stream of about 5 to 10 lbs. per hour of the solvent is withdrawn from the conduit 42 through a conduit 43 which is connected with a photometric analyzer 45. This side stream is returned to the conduit 42 through a conduit 44. Also carried to the photometric analyzer is an approximately equal side stream of the wax-mix from the repulp filters carried in the conduit 34. This side stream is carried to the photometric analyzer by a conduit 46 and is returned to the conduit 34 through a conduit 47 after passing through the analyzer.

The photometric analyzer 45 is time shared between the two streams and is calibrated to analyzer for the methyl-ethyl ketone content of these streams. A suitable photometric analyzer which can be used is the Du Pont Model 400, manufactured by E. I. Du Pont de Nemours and Company. In order to provide for time sharing between the two sample streams the photometric analyzer is equipped with a conventional timer and sample system. The analyzer 45 provides an electrical signal proportional to the methyl-ethyl ketone content of the solvent sample stream and another electrical signal proportional to the methyl-ethyl ketone content of the wax-mix stream. The latter signal is in turn proportional to the solvent content of the wax-mix stream in the conduit 34. The signals from the analyzer 45 are transmitted to a computer and control facility 50. Also transmitted to the computer and control facility are the signals from the flowmeter 13 measuring the oil stock charge rate to the process, the flowmeter 36 measuring the wax-mix stream flow rate, the flowmeter 29 measuring the repulp dilution rate, and the flowmeter 25 measuring the primary filter solvent wash rate.

The computer and control facility 50 includes two basic sections. A first section is the oil in wax computation section 50a which computes the amount of oil in the wax-mix stream by application of a mass balance relationship to the information of the charge rate to the process and the information from the photometric analyzer of the methyl-ethyl ketone content of the solvent and wax-mix streams. The second section of the computer and control facility 50 includes computation elements and process control equipment for controlling the process by adjustments of controllable variables thereof in response to the oil content of the wax-mix stream. Also, the computer and control facility includes manual entry provisions, such as control console, for entering into the computer the preferred nominal or quiescent operating points of the controlled variables, and for entering into the computer a signal proportional to the removable wax content of the lubrication oil stock. The amount of removable wax, of course, depends upon the desired pour point of the oil, and generally, the lower the pour point required of the oil the lower must be the dewaxing temperature, and the greater is the amount of wax removed from the oil stock. The pour point and the dewaxing temperature are predetermined by laboratory tests and established as boundary conditions of operation of the system. Therefore, the amount of wax removed from the lubrication oil stock is a predetermined quantity in order to achieve the desired pour point of the oil. Information of this predetermined quantity is entered into the computer and control facility 50 by the latter mentioned signal.

To solve for the amount of oil in the wax-mix stream, the oil in wax computation section, 50a, of the computer combines the signals of the process charge rate, the wax-mix stream flow rate, the predetermined removable wax, and the signals from the photometric analyzer in accordance with the following preferred mass balance relationship:

$$Q = F_2 - F_1 b - \frac{F_2 x_1}{a} \quad (1)$$

where:

$F_1$ = the oil stock charge rate,
$F_2$ = the wax-mix stream flow rate,
$x_1$ = the detected concentration of methyl-ethyl ketone in the wax-mix stream,
$a$ = the detected concentration of methyl-ethyl ketone in the solvent,
$b$ = the predetermined fraction of removable wax in the oil stock,
$Q$ = the amount of oil in the wax-mix stream expressed as a flow rate.

In response to the computation of the amount of oil in the wax-mix stream the control section 50b of the computer computes and executes control corrections required of the repulp dilution, i.e., the repulp-mix liquids-to-solids ratio and the primary filters solvent wash rate. These control corrections are computed in accordance with one or more control functions pre-programmed in the computer. These and the control criteria are further discussed in reference to FIGS. 3, 4, and 5. The control section 50b of the computer includes conventional pneumatic valve operators for continuous control of the valves 30 and 26, respectively, controlling the repulp dilution solvent flow rate and the primary filters wash rate. These pneumatic control signals are carried from the computer and control facility to the valves 30 and 26 by conduits 51 and 52, respectively.

Referring now to FIG. 2 which is a schematic block diagram of an analog computing system which can be used as the oil in wax computation section 50a, of the computer 50, shown in FIG. 1, a potentiometer 61 is provided which is connected with a regulated electrical voltage source not shown. The potentiometer 61 provides an electrical current signal proportional to the position of its input shaft. This is manually set to correspond to the value $b$, the amount of removable wax in the oil stock charged to the process. This signal is transmitted to a conventional analog multiplication device 63. Also provided is a potentiometer 62 connected with the regulated voltage source. The potentiometer 62 is manually set to correspond to the value $Q_t$, the target value of the oil in the wax-mix stream. This target value is determined in advance as discussed below in reference to FIGS. 3 and 4. The $Q_t$ signal from the potentiometer 62 is transmitted to a conventional analog subtraction device 64.

The signal, $F_2$, corresponding to the flow rate of the wax-mix stream provided by the flowmeter 36 is transmitted to a conventional analog multiplication device 65. Also transmitted to the analog multiplication device 65 is the signal $x_1$, corresponding to the methyl-ethyl ketone concentration in the wax-mix stream from the photometric analyzer 45. The multiplication device 65 multiplies its input signals and provides an electrical current analog output signal corresponding to the product, namely, $F_2 x_1$. The signal from the multiplication device 65 is transmitted to a conventional analog division device 66. Also transmitted to the division device 66 is the signal $a$ from the photometric analyzer 45 corresponding to the detected methyl-ethyl ketone concentration in the solvent. The division device 66 divides the former signal by the latter and provides an output signal corresponding to this quotient, namely, $F_2 x_1/a$. This signal is in turn transmitted to a conventional analog subtraction device 67. Also transmitted to the subtraction device 67 is the signal $F_2$ from the flowmeter 36 corresponding to the wax-mix stream flow rate. The subtraction device 67 subtracts from the latter flow rate signal the former quotient signal and provides an output electrical analog signal corresponding to this difference, namely, $$F_2 - \frac{F_2 x_1}{a}$$

This output signal is in turn transmitted to another subtraction device 68.

The signal $F_1$, which is provided by the flowmeter 13, corresponding to the charge rate of the oil stock to the process is transmitted to the multiplication device 63. The multiplication device 63 multiplies the $F_1$ signal by the former of its input signals, i.e. the $b$ signal of the oil stock removable wax and provides an electrical analog output signal corresponding to this product namely, $F_1 b$. This signal is in turn transmitted to the subtraction device 68 which subtracts the latter signal from the former of its input signals and provides an electrical analog output signal corresponding to this difference. It can be seen that the output signal from the subtraction device 68 corresponds to the amount of oil in the wax-mix stream in accordance with Equation 1 above.

The oil in wax signal thus generated is transmitted to a chart recorder 69 where it is recorded and can be observed. This signal is also transmitted to the subtraction device 64 which also receives the oil in wax target value signal, $Q_t$, from the potentiometer 62. The subtraction device 64 subtracts the former signal from the target value signal and provides an output signal corresponding to this difference, namely, E, the error of the amount of oil in the wax-mix stream. This signal is in turn transmitted to the control section 50b of the computer and control facility where it is utilized as discussed below in reference to FIG. 5. The error signal is also transmitted to the chart recorder 69 where it is recorded and can be observed.

Figure 5:
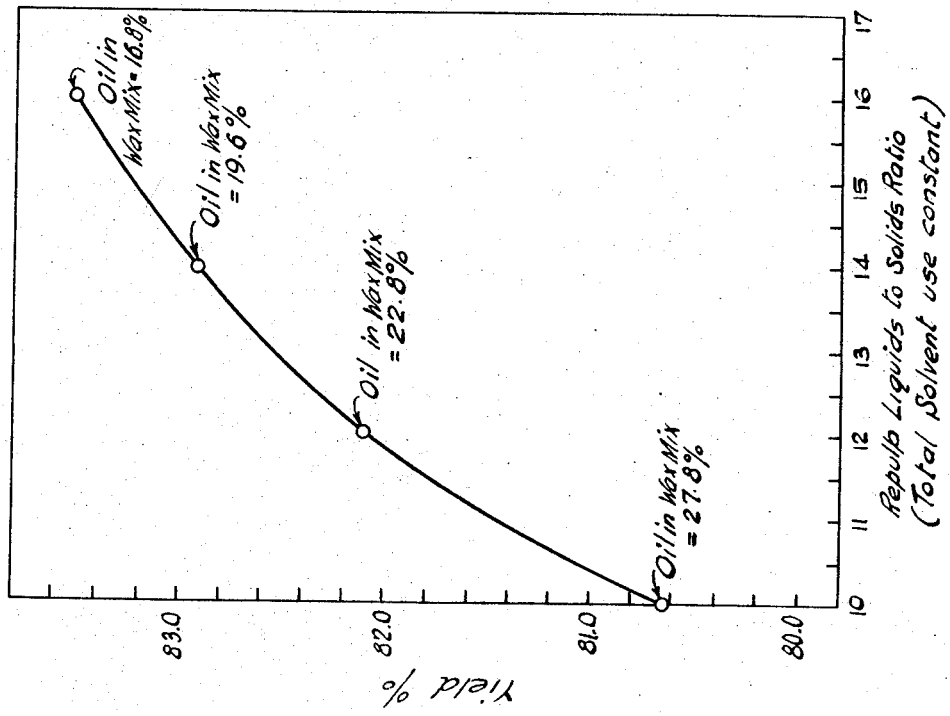
FIG. 5 is a graph of a family of curves representing yield plotted against total solvent used illustrating the effects of various primary wash ratios on yield for a typical dewaxing process.

Referring now to FIGS. 3, 4, and 5 which graphically illustrate the effects on yield and through-put of controlling the process by its predominant controllable variables, the curves of these figures are drawn with reference to a typical dewaxing facility operating with an oil stock charge rate in the range of about 4,700–5,500 barrels per day. The oil stock of this example is a medium viscosity stock having a wax content of about 13%. FIG. 3 illustrates the dependence of yield on the repulp liquids-to-solids ratio. In this example the process is operated at a total dewaxed oil output of about 4,500 barrels per day. The primary dilution factor is about 1.7 and the primary filter wash ratio is about 1.2. To illustrate the importance of the repulp liquids-to-solids ratio the curve is drawn with the total solvent are held constant. That is, as the repulp liquids-to-solids ratio is increased by increasing the repulp dilution the other solvent uses such as primary dilution and washing are regarded as being correspondingly decreased, thereby maintaining fairly constant the solvent recovery requirements. The yield is represented as the percentage of charge which is produced as dewaxed oil. This is inversely related to the amount of oil in the wax-mix stream. Hence, a given improvement in yield is directly manifested by a corresponding decline in the amount of oil in the wax-mix stream. FIG. 3 illustrates that substantial improvements of yields can be obtained by varying the repulp liquids-to-solids ratio in an increasing manner from the value of 10 to the value of 16 in this example.

Using the same example, FIG. 4 illustrates the effects of the repulp liquids-to-solids ratio on the maximum dewaxed oil produced per day. As the repulp liquids-to-solids ratio is increased the efficient capacity of certain of the dewaxing equipment is exceeded. In this instance, the amount of charge the repulp filters can process is the limiting factor. As the repulp liquids-to-solids ratio is increased from a value of about 14 to a value of about 15.5 the overload of the repulp filters is acutely manifested by a sharp decline in the productivity of the process from a value of about 4,650 to a value of about 4,400 barrels per day. Also, over the same range FIG. 3 shows an improvement of yield of only about .5%. However, when the repulp liquids-to-solids ratio is increased in the lower ranges such as from about 10 to about 14 much greater improvements of yield are obtained with almost no compromise in the process productivity. It can be seen from these curves that controlling the repulp liquids-to-solids ratio is a most effective way of controlling the process yield while obtaining a predetermined level of process productivity.

For automatic control such as illustrated in FIG. 1 it is preferred to establish, in advance, the quiescent or normal operating points of the process throughput and the repulp liquids-to-solids ratio in accordance with FIGS. 3 and 4, for best economic operation. The yield predetermined in this way is readily converted to a numeric quantity corresponding to $Q_t$, the amount of oil in the wax-mix stream. This value is preset in the computer and control facility 50 of FIG. 1. The corresponding choice of the repulp liquids-to-solids ratio is likewise set into the computer and control facility.

Referring now to FIG. 5 which illustrates the dependence of yield on the primary filter solvent wash ratio. The yield is plotted against total solvent useage for a family of wash ratio curves. It is shown that with either constant total solvent useage or with increasing solvent useage when the wash ratio is increased this results in an increased yield.

In view of FIGS. 3, 4, and 5, a preferred mode of control of the typical dewaxing process shown in FIG. 1 is to use the repulp dilution as a first control variable which in this example would be set at a quiescent or normal operating point somewhere near the value corresponding to a liquids-to-solids ratio of 12.0. Also, in this example the control loop gain in the computer and control facility 50 would be such that the liquids-to-solids ratio would be controlled over a range of about 11 to 15. Then, the wash ratio is controlled after the repulp liquids-to-solids ratio reaches its control limit in adjusting to maintain the oil in the wax-mix stream at its predetermined level. In this example, the wash ratio control would be set at a quiescent value of about 0.8 and when the repulp liquids-to-solids ratio exceeds its limit of about 11 to 15 the wash ratio is then varied. In the event of a sustained error signal E, which is not overcome by controlling the repulp liquids-to-solids ratio or the wash ratio, the process charge rate should be manually decreased. This, in effect, increases the three basic control variables, i.e., the primary dilution, the wash ratio, and the repulp liquids-to-solids ratio. Also, it is to be understood that should the oil in the wax-mix stream be below its target value in the normal course of operating the system at the predetermined quiescent operating points, with the aforementioned repulp dilution control, no secondary control actions of wash rate or process charge rate adjustments are required.

It is to be appreciated by those skilled in the art that the curves of FIGS. 3, 4, and 5 while directed to a specific example exhibit the fundamental interrelationships between the illustrated variables which are common to most dewaxing facilities. The exact numeric values of the variables depend upon the particular dewaxing facility and the same curves can be drawn for any dewaxing facility either analytically, or preferably, by test runs.

Referring now to FIG. 6, which illustrates an analog computing and control system which can be used as the control section 50b of the computer and control facility shown in FIG. 1, the error signal E from the oil in wax computation section is transmitted to a scaling circuit 80 which is a conventional analog multiplication device. A potentiometer 81 is provided which is connected with a regulated voltage supply, not shown, and which is manually set to provide a scaling signal $K_d$ for the error signal E, for adjusting the gain of the control system. The scaling signal is transmitted to the scaling circuit 80 which multiplies its two input signals and provides a corresponding output signal, namely, $K_dE$. This signal is in turn transmitted to a conventional analog addition device 82. A potentiometer 83 is provided, connected to the regulated voltage source, which is manually set to the predetermined quiescent repulp dilution operating point, designated $Q_r$. The $Q_r$ signal from the potentiometer 83 is transmitted to the addition device 82, which adds its two input signals and provides a corresponding output signal, $K_dE+Q_r$. Hence, this signal corresponds to a summation of the adjusted error signal and the quiescent repulp dilution operating point. This signal is in turn transmitted to a conventional cascade controller 84, where it is utilized as the controller's set-point. A suitable controller which can be used is the model M-61, manufactured by the Foxboro Co. of Foxboro, Mass. The signal of the repulp solvent flow rate provided by the flowmeter 29 is transmitted to the controller 84. In response to the flow rate signal and the error adjusted repulp dilution signal from the addition device 82, the controller provides an electrical control signal representing an adjusted operating position of the valve 30 controlling the flow rate of the repulp dilution solvent. This control signal is transmitted to a conventional pneumatic valve operator 85 which converts the electrical signal to a pneumatic control signal, which is in turn, carried by the conduit 51 to the valve 30 controlling its position. A suitable pneumatic pressure source 86 is provided which is coupled to the pneumatic valve operator 85 to provide the required pneumatic pressure.

A potentiometer 90 is provided connected with the regulated voltage supply and which is manually set to a position corresponding to the wash control off-set designated $O_E$. This off-set corresponds to the degree of control to be performed solely by the above adjustments of the repulp liquids-to-solids ratio. The off-set signal $O_E$ is transmitted to a comparator 91. Also transmitted to the comparator 91 is the error signal E. The comparator 91 includes conventional comparator circuitry for comparing E with $O_E$, and further includes a switched output circuit which permits the E signal to pass when it exceeds the preset value $O_E$. This E signal is in turn transmitted to a conventional analog division device 92. A potentiometer 93 is provided, connected with the regulated voltage source and which is manually set to a position corresponding to a predetermined quiescent primary filter wash rate. This wash rate signal $Q_w$, from the potentiometer 93, is transmitted to the addition device 92, which adds its two input signals which provides an output signal corresponding to the sum $E+Q_w$. This signal corresponds to the quiescent primary filter wash rate adjusted by the error signal E. This adjusted signal is in turn transmitted to a cascade controlled 94 where it is utilized as the controller's set point. The same controller 94 can be used as the instance of the controller 84. The primary wash flow rate signal, from the flowmeter 25, is transmitted to the controller 94. In response to its two input signals the controller 94 provides an electrical control signal corresponding to the required operating position of the valve 26 controlling the flow rate of the primary filters washing solvent. This electrical signal is in turn transmitted to a pneumatic valve operator 95 which is coupled to the pneumatic pressure source 86. The pneumatic valve operator 95 in response regulates the pneumatic pressure in the conduit 52 controlling the operative position of the valve 26, hence, controlling the primary filters wash rate.

With respect to the specific quantitative example discussed in reference to FIGS. 3, 4, and 5 the following information serves to further illustrate the operation of the control loop. In this example the target value of the oil in the wax-mix stream should be set to a level of 20%. The gain in the system should be set, by adjustment of $K_d$, at a level such that a 1% variation from the target value of the oil the wax-mix stream results in a correction of the liquids-to-solids ratio factor of about 2.0 units. This, in turn, corresponds to an adjustment of about 20,000 lbs. per hour of solvent flow in the repulp dilution. The quiescent operating point of the repulp dilution is set at a value of about 90,000 lbs. per hour, resulting in a quiescent repulp liquids-to-solids ratio factor of about 12, and according to the above, the dilution would be increased about 20,000 lbs. per hour for each 1% increase above the 20% target value of the oil in the wax-mix stream. This mode of control would be used until a maximum repulp dilution rate of about 130,000 lbs. per hour is attained, that is, until the oil in the wax-mix stream reaches a value of 22%. At this point the primary filter solvent wash rate control should be automatically initiated by the comparator 91 passing the signal E. Hence, the setting of the wash control off-set potentiometer is set at a value of 2% above the 20% target value setting $Q_t$, of the oil in the wax-mix stream.

In the event that repulp dilution flow increases to the maximum value of 130,000 lbs. per hour do not maintain the oil content of the wax-mix stream at the target value then the primary wash solvent rate is automatically increased by the system of FIG. 6. If the target value is not thereby obtained and such increases exceed the capacity of any of the limiting factors such as, the capacity of the solvent recovery system or the capacity of the repulp filters, than the process charge rate should be manually adjusted downwardly. The reduction in charge should be manually undertaken by an operator upon the occurrance of a high level alarm signal provided by the flowmeter 25. The flowmeter 25 hence incorporates in its output circuit suitable provisions to provide such a high level alarm when the measured flow rate exceeds its limiting value. This value is determined in advance in accordance with the aforementioned limitations in the equipment and entered into the flowmeter 25.

While the above descriptions have been directed to the application of special purpose electrical analog computing equipment it can be appreciated by those skilled in the art that a digital computer can be quite advantageously used in their place. In this instance the various predetermined set-points and the aforementioned control sequence can be pre-programmed in the computer. The output signals of such a computer would be convered from digital to analog and applied directly to suitable valve control equipment on the process. The use of digital computer provides a major advantage due to the inherent accuracy of its computations. It also can be appreciated by those skilled in the art that pneumatic computation elements can be used in place of the electrical analog computation elements described.

While the invention has been described with a certain degree of particularity, it can, nevertheless, be seen by the examples hereinabove set forth that many modifications and variations of the invention may be made without departing from the spirit and scope thereof.

We claim:

1. In a solvent dewaxing process for removing a predetermined portion of wax from a lubricating oil stock, said process including the steps of mixing said oil stock with a solvent under conditions effecting crystallization of said wax, and from the resulting mixture removing crystallized wax in the form of a wax mixture, said wax mixture containing minor components of oil and solvent entrained therein, said dewaxinng process including at least one controllable variable affecting the amount of said oil entrained in said wax mixture, a method for controlling said solvent dewaxing process comprising the steps of:
   (a) sensing the rate at which said lubrication oil stock is introduced into said dewaxing process and providing a first signal representative thereof;
   (b) sensing the rate at which said by-product wax mixture is removed from said dewaxing process and providing a second signal representative thereof;
   (c) providing a third signal representative of said predetermined wax portion for removal of said lubricating oil stock introduced into said process;
   (d) detecting said solvent component entrained in said wax mixture and providing a fourth signal representative thereof;
   (e) combining said first, second, third and fourth signals in accordance with a mass balance relationship relating the amount of said oil entrained in said by-product wax mixture with said oil stock rate into said process, said portion thereof of wax for removal, said rate of removal of said wax mixture, and said solvent component entrained in said wax mixture, and providing a fifth signal representative of said oil component entrained in said wax mixture; and
   (f) controlling said controllable variable of said dewaxing process in response to said fifth signal whereby said dewaxing process is controlled in response to said oil component entrained in said wax mixture.

2. In a solvent dewaxing process for removing a predetermined portion of wax from a lubricating oil stock, said process including the steps of mixing said oil stock with a solvent under conditions effecting crystallization of said wax, and from the resulting mixture removing crystallized wax in the form of a wax mixture, said wax mixture containing minor components of oil and solvent entrained therein, said dewaxing process being of a nature such that variations of the rate of said lubrication oil stock introduced into said dewaxing process affect the amount of said oil entrained in said wax mixture, a method for controlling said solvent dewaxing process comprising the steps of:
   (a) sensing the rate at which said lubrication oil stock is introduced into said dewaxing process and providing a first signal representative thereof;
   (b) sensing the rate at which said wax mixture is removed from said process and providing a second signal representative thereof;
   (c) providing a third signal representative of said predetermined wax portion for removal of said lubricating oil stock introduced into said process;
   (d) detecting said solvent component entrained in said wax mixture and providing a fourth signal representative thereof;
   (e) combining said first, second, third and fourth signals in accordance with a mass balance relationship relating the amount of said oil entrained in said wax mixture with said oil stock rate into said process, said portion thereof of wax for removal, said rate of removal of said wax mixture, and said solvent component entrained in said wax mixture, and providing a fifth signal representative of said oil component entrained in said wax mixture; and
   (f) controlling the rate at which said oil stock is introduced into said dewaxing process in response to said fifth signal whereby said wewaxing process is controlled by adjusting the rate at which said oil stock is introduced thereto in response to said oil component entrained in said wax mixture.

3. The method of claim 1 wherein said dewaxing process includes the further step of washing said wax mixture with a solvent to remove entrained oil therefrom, and wherein said controlling step (f) comprises:
   (f) regulating said solvent washing of said wax mixture in response to said fifth signal in a manner such that increases of said solvent washing tend to decrease the amount of said oil entrained in said wax mixture and decreases of said solvent washing tend to increase the amount of said oil entrained in said wax mixture whereby said dewaxing process is controlled in a manner tending to regulate the amount of said oil entrained in said solvent washed wax mixture.

4. The method of claim 3 wherein said solvent washing includes contacting said wax mixture with a spray stream of said washing solvent and wherein said regulating step (f) includes regulating the flow rate of said spray stream of washing solvent in response to said fifth signal.

5. The method of claim 1 wherein said solvent dewaxing process includes the further steps, for removing oil entrained in said wax mixture, of mixing said wax mixture with a solvent under conditions causing dilution and recrystallization of said wax, from the resulting mixture removing wax as a recrystallized wax mixture, and washing said recrystallized wax mixture with solvent to further remove oil entrained therein, said solvent washed recrystallized wax mixture containing minor components of oil and solvent entrained therein, wherein said wax rate sensing step (b) and said solvent detecting step (d) are performed with respect to said solvent washed recrystallized wax mixture, wherein said controlling step (f) comprises:
   (f) regulating said solvent washing of said recrystallized wax mixture in response to said fifth signal in a manner such that increases of said solvent washing tend to decrease the amount of said oil entrained in said recrystallized wax mixture and decreases of said solvent washing tend to increase the amount of said oil entrained in said recrystallized wax mixture whereby said dewaxing process is controlled in a manner tending to regulate the amount of said oil entrained in said solvent washed recrystallized wax mixture.

6. In a solvent dewaxing process for removing a predetermined portion of wax from a lubricating oil stock, said process including the steps of mixing said oil stock with a solvent under conditions effecting crystallization of said wax, and from the resulting mixture removing crystallized wax in the form of a wax mixture, said wax mixture containing minor components of oil and solvent entrained therein, a method for providing a signal representative of said oil component entrained in said wax mixture comprising the steps of:
  (a) sensing the rate at which said lubrication oil stock is introduced into said dewaxing process and providing a first signal representative thereof;
  (b) sensing the rate at which said wax mixture is removed from said process and providing a second signal representative thereof;
  (c) providing a third signal representative of said predetermined wax portion for removal of said lubricating oil stock introduced into said process;
  (d) detecting said solvent component entrained in said wax mixture and providing a fourth signal representative thereof;
  (e) combining said first, second, third and fourth signals, and providing a fifth signal, in accordance with a mass balance relationship relating the amount of said oil entrained in said wax mixture with said oil stock rate into said process, said portion thereof of wax, for removal, said rate of removal of said wax mixture, and said solvent component entrained in said wax mixture thereby providing a fifth signal representative of said oil component entrained in said wax mixture.

7. The method of claim 6 wherein said solvent comprises a mixture of a first constituent characterized as an oil solvent, and a second constituent characterized as a wax anti-solvent and wherein said solvent detecting step (d) comprises:
  (d) detecting the concentration of one of said solvent constituents in said wax mixture and providing a fourth signal representative thereof, thereby providing a fourth signal representative of the concentration of said solvent component entrained in said wax mixture.

8. In a solvent dewaxing process for removing wax from a lubrication oil stock including the steps of mixing said oil stock with a solvent under conditions effecting crystallization of said wax, and from the resulting mixture removing crystallized wax in the form of a wax mixture, said solvent comprising a mixture of a first oil solvent constituent selected from a group consisting of aromatics, and a second wax anti-solvent constituent selected from a group consisting of ketones, the concentration of said second wax anti-solvent constituent in said solvent mixture being predetermined, said wax mixture removed from said oil stock containing a minor component of said solvent mixture entrained therein, a method for providing a signal corresponding to the amount of said solvent mixture entrained in said wax mixture comprising the steps of:
  (a) passing a sample of said wax mixture through a photometric analyzer calibrated for analysis of said wax antisolvent constituent of said solvent mixture, said photometric analyzer providing an electrical signal proportional to the concentration in said wax mixture sample of said wax anti-solvent constituent; and
  (b) amplifying said electrical signal by a factor relating said electrical signal with said predetermined concentration of said wax anti-solvent constituent in said solvent mixture, said amplified signal thereby corresponding to the amount of said solvent mixture entrained in said wax mixture.

9. In a solvent dewaxing facility for removing a predetermined portion of wax from a lubrication oil stock including means for mixing said oil stock with a solvent under conditions effecting crystallization of said wax and means for removing from the resulting mixture crystallized wax in the form of a wax mixture, said wax mixture containing minor components of oil and solvent entrained therein, apparatus for determining the amount of oil entrained in said wax mixture comprising:
  (a) means, coupled to the inlet section of said dewaxing facility, for sensing the rate at which said lubrication oil stock is introduced into said dewaxing facility and for providing a first signal representative thereof;
  (b) means, coupled with said wax removing means, for sensing the rate of removal of said wax mixture and for providing a second signal representative thereof;
  (c) means, coupled with said wax removing means, for detecting said solvent component entrained in said wax mixture and for providing a fourth signal representative thereof; and
  (d) computing means, including manual entry and signal generating means, coupled with said rate sensing means (a) and (b) and coupled with said solvent detecting means (c), for generating a third signal in response to a manual setting of said manual entry means corresponding to said predetermined portion of wax for removal, said third signal being thereby representative of said predetermined wax portion for removal of said lubrication oil stock, said computing means also for combining said first, second, third, and fourth signals, and for providing a fifth signal, in accordance with a mass balance relationship relating the amount of said oil entrained in said wax mixture with said oil stock rate into said process, said portion thereof of wax for removal, said rate of removal of said wax mixture, and said solvent component entrained in said wax mixture, thereby providing a fifth signal representative of said oil component entrained in said wax mixture.

10. In a solvent dewaxing facility for removing a predetermined portion of removable wax from a lubrication oil stock including means for mixing said oil stock with a solvent under conditions effecting crystallization of said wax and means for removing from the resulting mixture crystallized wax in the form of a wax mixture containing minor components of oil and solvent entrained therein, said dewaxing facility including at least one controllable variable thereof affecting the amount of said oil entrained in said wax mixture, apparatus for controlling said solvent dewaxing facility comprising:
  (a) means, coupled with the inlet section of said dewaxing facility, for sensing the rate at which said lubrication oil stock is introduced into said dewaxing facility and for providing a first signal representative thereof;
  (b) means, coupled with said wax removing means, for sensing the rate of removal of said wax mixture and for providing a second signal representative thereof;
  (c) means, coupled with said wax removing means, for detecting said solvent component entrained in said wax mixture and for providing a fourth signal representative thereof;
  (d) computing means, including manual entry and signal generating means, coupled with said rate sensing means (a) and (b) and coupled with said solvent detecting means (c), for generating a third signal in response to a manual setting of said manual entry means corresponding to said predetermined portion of wax for removal, said third signal being thereby representative of said predetermined wax portion for removal of said lubrication oil stock, said computing means also for combining said first, second, third, and fourth signals, and for providing a fifth signal, in accordance with a mass balance relationship relating the amount of said oil entrained in said wax mixture with said oil stock rate into said process, said portion thereof of wax for removal, said rate of removal of said wax mixture, and said solvent component entrained in said wax mixture, thereby providing a fifth signal representative of said oil component entrained in said wax mixture; and (e) means, coupled with said computing means (d), for controlling said controllable variable of said dewaxing facility in response to said fifth signal whereby said dewaxing facility is controlled in response to said oil component entrained in said wax mixture.

11. The method of claim 1 wherein said dewaxing process includes the further steps, for removing oil entrained in said wax mixture, of, repulping said wax mixture by mixing said wax mixture with a solvent under conditions causing dilution and recrystallization of said wax resulting in a repulp mixture thereof, and from said repulp mixture removing wax in the form of a recrystallized wax mixture, wherein said recrystallized wax mixture contains minor components of oil and solvent entrained therein, wherein said wax rate sensing step (b) and said solvent detecting step (d) are performed with respect to said recrystallized wax mixture, and wherein said controlling step (f) comprises:

(f) controlling the liquids-to-solids ratio of said repulp mixture by increasing said liquids-to-solids ratio when said fifth signal of the amount of oil entrained in said recrystallized wax mixture exceeds a predetermined target value, and by decreasing said liquids-to-solids ratio when said fifth signal is less than a predetermined target value.

12. The method of claim 11 wherein said liquids-to-solids ratio is controlled by controlling the flow rate of said solvent mixed with said max mixture by said repulping step.

13. In a solvent dewaxing process for removing wax from a lubricating oil stock, said process including the steps of mixing said oil stock with a solvent under conditions effecting crystallization of said wax, from the resulting mixture removing crystallized wax in the form of a first removed wax mixture containing at least a minor component of oil entrained therein, repulping said wax mixture by mixing said wax mixture with a solvent under conditions causing dilution and recrystallization of said wax resulting in a repulp mixture thereof, and from said repulp mixture removing wax in the form of a recrystallized wax mixture, said recrystallized wax mixture containing at least a minor component of oil entrained therein, a method for controlling said solvent dewaxing process, comprising the steps of:

(a) generating a yield signal representative of the yield of said process; and (b) controlling said process by controlling the liquids-to-solids ratio of said repulp mixture by increasing said liquids-to-solids ratio when the value of said yield signal is indicative of a yield of said process below a predetermined target value, and by decreasing said liquids-to-solids ratio when the value of said yield signal is indicative of a yield of said process above a predetermined target value.

14. The method of claim 13 wherein said signal generating step (a) comprises generating a signal representative of the yield of said process by generating said signal to represent the amount of oil in said removed recrystallized wax mixture, and wherein said controlling step (b) comprises:

(b) controlling the flow rate of said solvent mixed with said wax mixture by said repulping step by increasing said flow rate when said signal of the oil in the removed recrystallized wax mixture is above a predetermined target value and by decreasing said flow rate when said signal is below a predetermined target value.

15. The method of claim 13 wherein said dewaxing process includes the further step of washing said first removed wax mixture with a solvent to remove entrained oil therefrom, and wherein said controlling step (b) comprises:

(ba) controlling the liquids-to-solids ratio of said repulp mixture by increasing said liquids-to-solids ratio when the value of said yield signal is indicative of a yield of said process below a predetermined target value, and by decreasing said liquids-to-solids ratio when the value of said yield signal is indicative of a yield of said process above a predetermined target value; and (bb) controlling said washing step by increasing said washing when the value of said yield signal is indicative of a yield of said process below a predetermined value by an amount greater than a predetermined amount.

16. In a solvent dewaxing process for removing wax from a lubricating oil stock, said process including the steps of mixing said oil stock with a solvent under conditions effecting crystallization of said wax, from the resulting mixture removing crystallized wax in the form of a first removed wax mixture containing at least a minor component of oil entrained therein, a method for determining a point of economic operation of said process comprising the steps of:

(a) obtaining a first relationship between the liquids-to-solids ratio of said repulp mixture and the yield of said process, said relationship demonstrating a tendency of said yield to increase as said repulp liquids-to-solids ratio is increased;

(b) obtaining a second relationship between the liquids-to-solids ratio of said repulp mixture and the through-put capability of said process, said relationship demonstrating a tendency of said through-put to decline as said repulp liquids-to-solids ratio is increased; and (c) comparing said first and second relationship to obtain a quiescent operating point of said repulp liquids-to-solids ratio.

References Cited

UNITED STATES PATENTS

| 2,723,941 | 11/1955 | Weeks et al. | 208—33 |
| 2,742,401 | 4/1956 | Kinchen | 208—33 |
| 3,083,154 | 3/1963 | Gersic et al. | 208—33 |
| 3,285,846 | 11/1966 | King et al. | 208—28 |
| 3,458,432 | 7/1969 | Woodle et al. | 208—36 |

HERBERT LEVINE, Primary Examiner

U.S. Cl. X.R.

23—230, 253; 196—14.5; 235—151.12, 151.13